Feb. 17, 1931.   C. H. BAUER ET AL   1,793,302
ADVERTISING DEVICE
Filed June 17, 1929   6 Sheets-Sheet 5
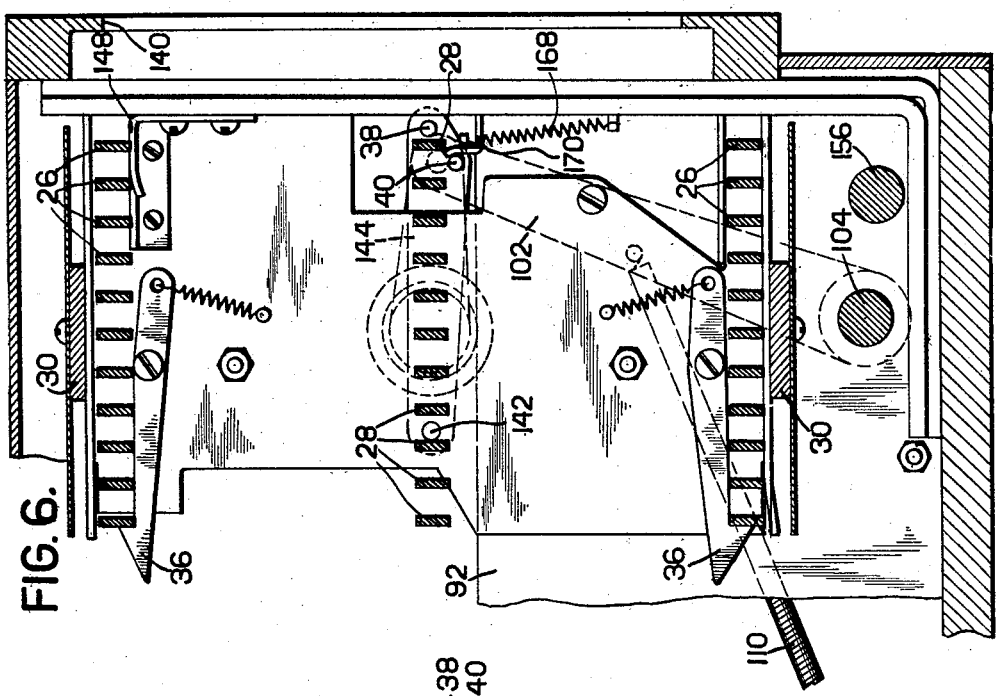
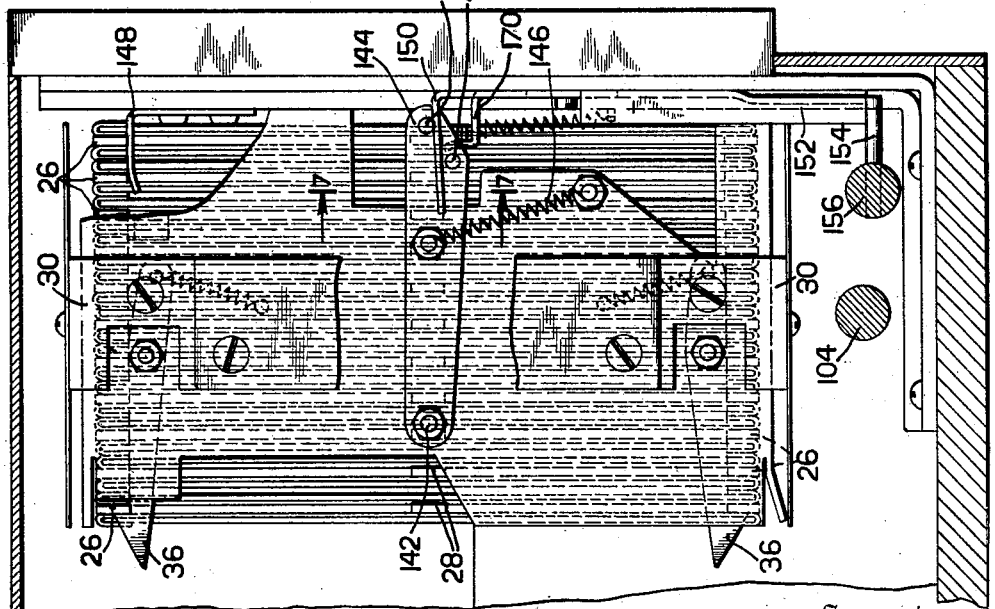
Inventor
CHARLES H. BAUER
and CHARLES ROBERTS
By their Attorneys
Cooper, Kerr & Dunham

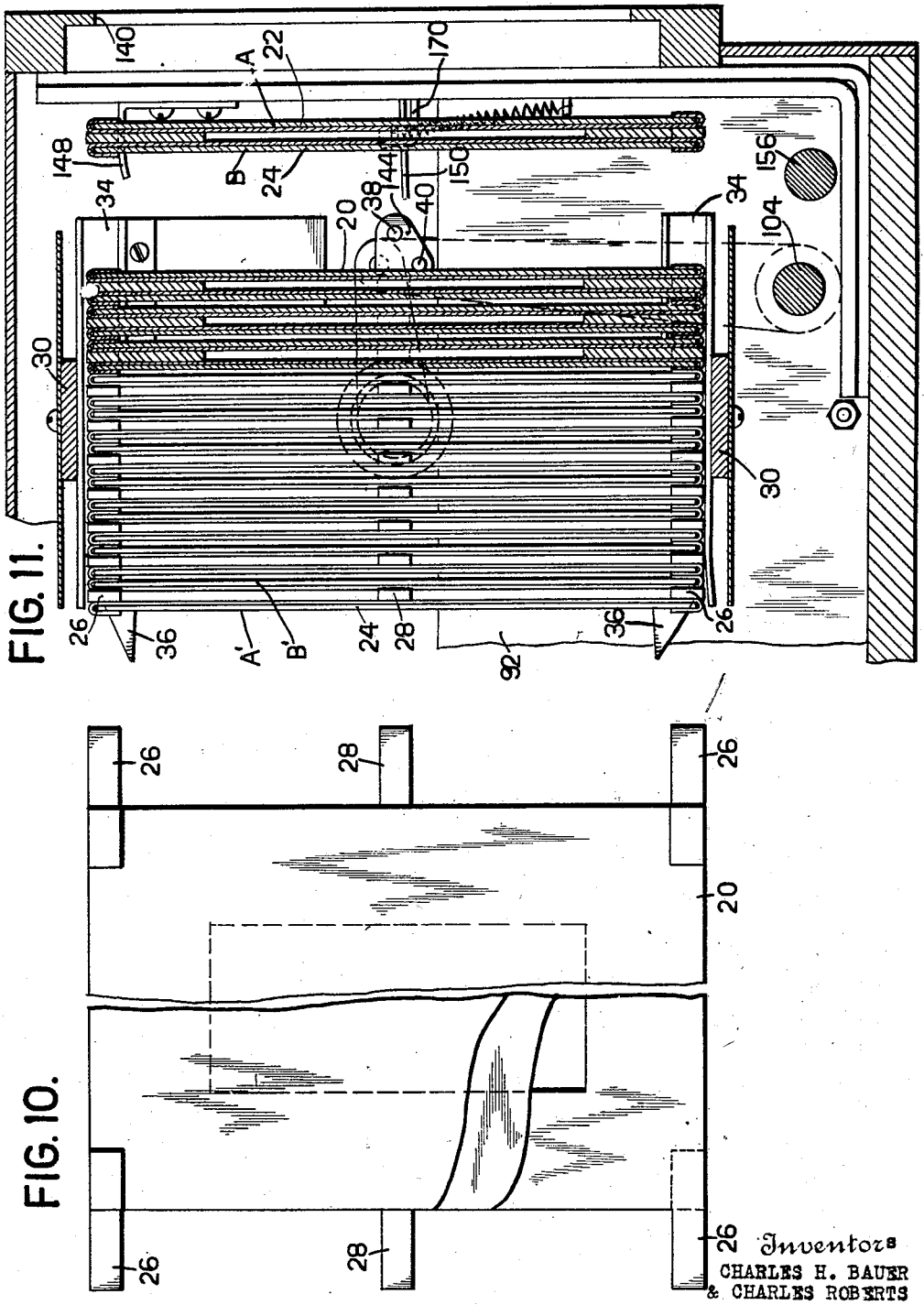

Patented Feb. 17, 1931

1,793,302

UNITED STATES PATENT OFFICE

CHARLES H. BAUER AND CHARLES ROBERTS, OF NEW YORK, N. Y., ASSIGNORS, BY DIRECT AND MESNE ASSIGNMENTS, TO CHARLES H. BAUER COMPANY, A CORPORATION OF DELAWARE

ADVERTISING DEVICE

Application filed June 17, 1929. Serial No. 371,355.

This invention pertains to advertising devices of the kind which display a plurality of advertising cards in rotation. Heretofore, devices of this kind have been bulky affairs which occupied so much space as to render them impractical in many situations.

The object of this invention is to provide a machine of small compass but capable of showing in recurring cycles a comparatively large number of comparatively large cards.

The cards are supported in a magazine or carrier adapted to advance and retreat horizontally, and also adapted to rotate on a horizontal axis. The cards are assembled in pairs, back to back,—therefore each card assembly has advertising matter on both front and rear sides. The carrier and card assemblies are so manipulated in the machine as to show all the front cards in order, one at a time, then all the rear cards in order, and then repeat, in recurring cycles.

Further and other objects and advantages will be apparent from the specification and claims, and from the drawings which show by way of illustration what is now considered the preferred embodiment of the invention.

Fig. 5 is an enlarged cross-section, on the line 5—5 of Fig. 1.

Fig. 6 is an enlarged cross-section, on the line 6—6 of Fig. 1.

Fig. 7 is an enlarged cross section, on the line 7—7 of Fig. 5.

Fig. 8 is a view similar to Fig. 7, with parts in a different position.

Fig. 9 is a cross-section, on the line 9—9 of Fig. 7.

Fig. 10 is an enlarged view of one of the card assemblies partly broken away.

Fig. 11 is an enlarged cross-section of Fig. 1, on the line 11—11.

Figure 1:
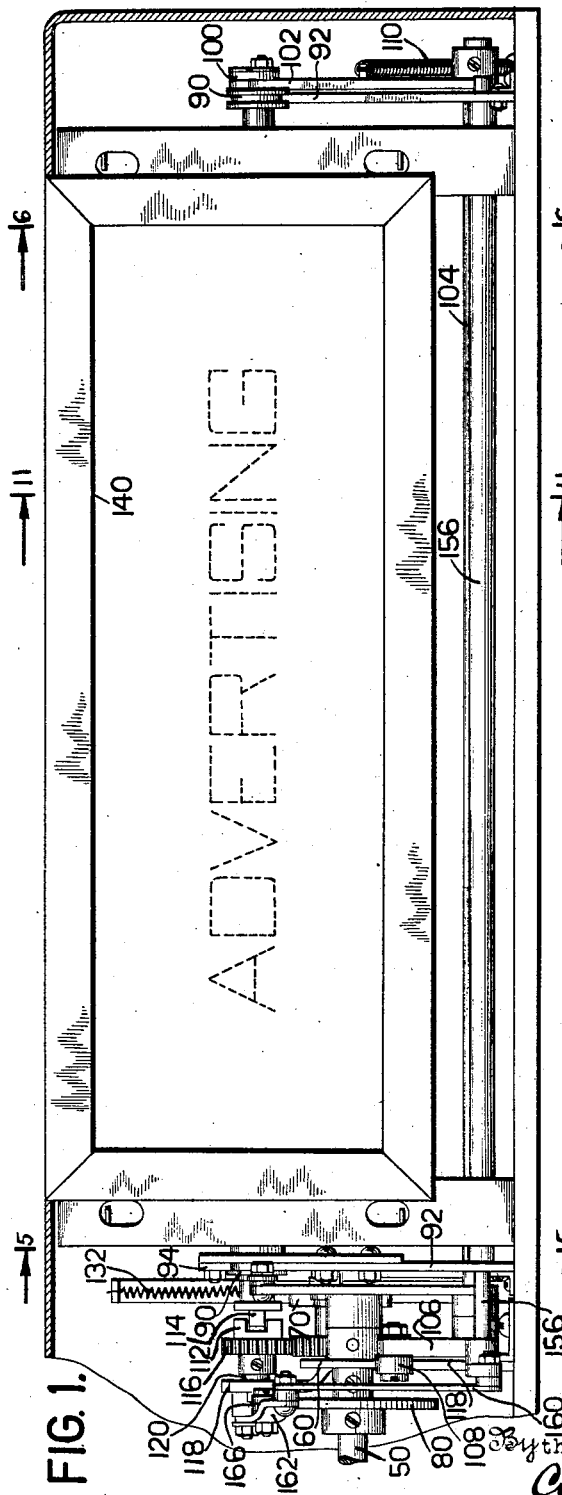
Fig. 1 is a front view of the machine with the cover partly broken away.

Referring to Figs. 10 and 11 it will be seen that each card assembly 20 comprises a front card 22 and a rear card 24. Each assembly is provided with horizontally projecting ears 26 at upper and lower corners, and similar ears 28 at the middle of each side.

Eleven card assemblies are shown in the drawings. Normally they are all held in closely packed relationship in a carrier or magazine 30, pivoted for rotation about shiftable horizontal shafts 32, one at each end of the magazine. The assemblies are supported by upper and lower channels 34, fast to frame 30, the channels engaging ears 26 of the cards. The assemblies are held in a close pack by spring actuated latches 36, on one side of the pack, and pin 38 or 40 on the other side thereof. Latches 36 engage ears 26, while pins 38 and 40 engage ears 28 in a manner to be later explained, but which will be clear enough for present purposes from Figs. 6 and 11.

The construction and operation of the machine will be described in three sections, first the movement of the magazine back and forth, second the revolving of the magazine, and finally the latching of a placard in display position.

Shaft 50 is driven at constant speed, usually by a motor. Fast on shaft 50 are three cams: 60, which moves the magazine back and forth; 70, which rotates the magazine; and 80, which latches and unlatches the card assemblies.

Figure 2:
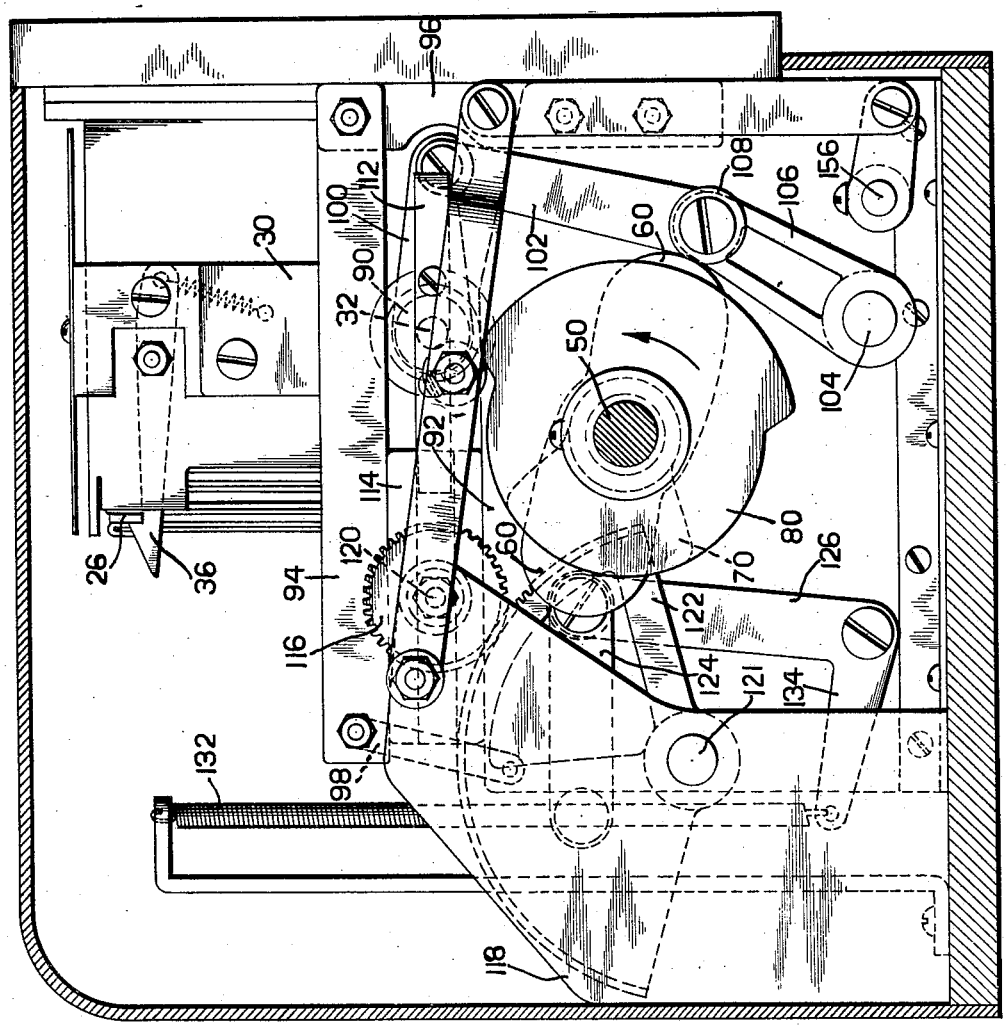
Fig. 2 is an enlarged view of Fig. 1, taken from the left side of Fig. 1.
Figure 4:
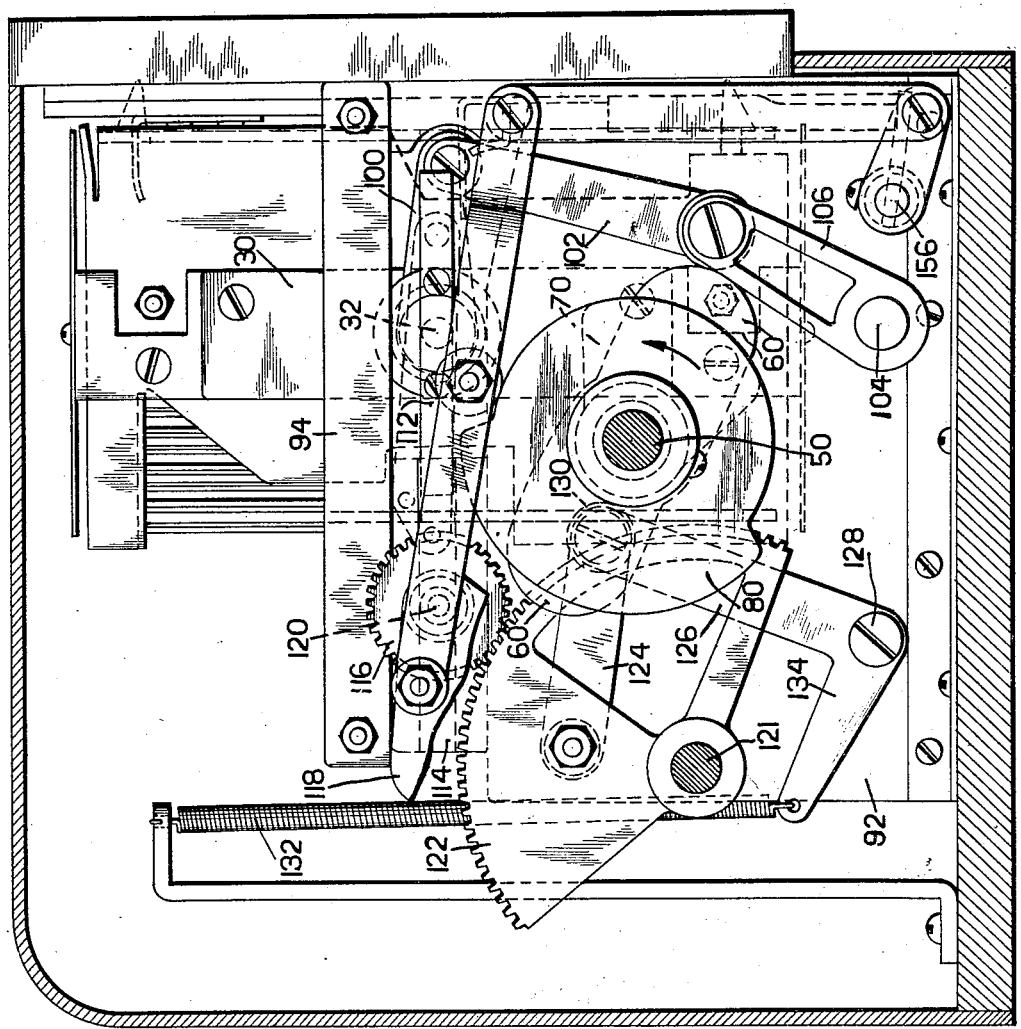

Each shaft 32, at the ends of the magazine, is carried in a flanged roller 90 adapted to roll on a horizontal guide 92. At the left end of the machine an overhead guard rail 94 serves to prevent roller 90 being accidentally raised out of engagement with rail 92. Rail 94 is supported in vertical brackets 96 and 98 (Fig. 2) fast at their lower ends to lower guide plate 92. Shafts 32 are connected by horizontal links 100, to the upper ends of vertical arms 102 which at their lower ends are fast to rock shaft 104 extending lengthwise of the machine. Also fast on shaft 104 is an upstanding arm 106, bearing at its upper end a roller 108 riding on cam 60. 60 is a double lobed cam, therefore during each revolution of shaft 50, shaft 104 will be rocked forward and backward twice. This means that the magazine will be moved to the rear and back again twice during each revolution of shaft 50. Spring 110 between arm 102 and the machine frame (Fig. 1) keeps roller 108 in contact with cam 60. Rigidly attached to frame 30, and symmetrical about shaft 32 at the left end of the machine, is a cross head 112 which is horizontal when frame 30 is vertical (Figs. 1, 2, 4). This cross-head moves back and forth in slotted member 114, rigidly attached to pinion 116 which is supported for rotation on shaft 120 at the upper end of frame member 118. Whenever frame 30 is at the end of its travel to the rear, its trunnion shafts 32 are in alignment with shaft 120, and are in that position when frame 30 is rotated by cam 70, as will now be described.

Figure 3:
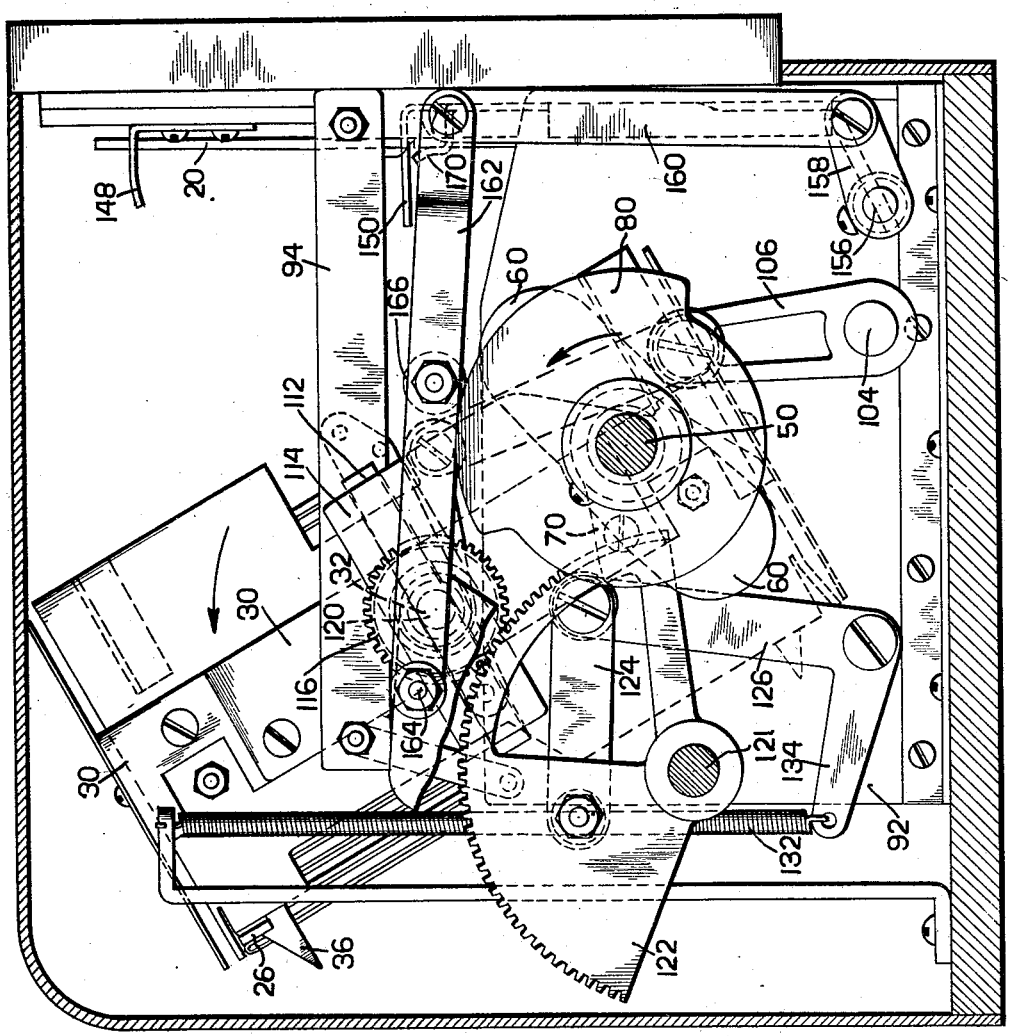
Figs. 3 and 4 are views similar to Fig. 2 with the parts in different positions.

Pivotally mounted on shaft 121 is a gear sector 122 in mesh with pinion 116. Sector 122 is connected by link 124 to the upper end of arm 126, pivoted at its lower end at 128 and bearing at its upper end a roller 130, rolling on cam 70. Roller 130 is kept in contact with the cam by spring 132 attached to arm 134 projecting from the lower end of arm 126. Cams 60 and 70 are so shaped and timed that each time shafts 32 are placed in alignment with pinion shaft 120 they are held there while gear sector 122 is rocked by cam 70 to rotate pinion 116 and the magazine 180 degrees. Fig. 3 shows the rotation operation taking place.

By the mechanism above described it will be appreciated that the magazine is moved first to the right, then to the left where it is rotated one-half revolution, then to the right again, then to the left where it is rotated through another half revolution, and finally repeats the first part of its cycle by moving again to the right.

At the end of its first movement to the right a card assembly is removed from the front of the magazine and left hanging with its front side in display position. While the card is in that position the magazine moves to the rear, turns over and then advances to the front again to engage the display card assembly and attach it to the rear of the magazine. Then the magazine retreats again, turns over, and again advances to hang the next card from the front of the machine in display position. Each card assembly, when attached to the rear of the magazine, is reversed with reference to its former position in the magazine,—therefore, when it is next hung in display position the side last displayed will be toward the rear and the side formerly at the rear will be displayed. For instance, in Fig. 11, card A is on display through window 140, while card B is at the rear of the assembly which comprises cards A and B. When this assembly is removed from the position there shown, it will be at the rear of the magazine with card B in position B' facing the front of the magazine, and card A in position A' facing the rear. Therefore when that particular assembly again reaches display position card B will be visible and card A hidden.

The means for latching and unlatching the card assemblies will now be described.

Pivotally mounted at 142 on each side of the magazine is a horizontal arm 144, bearing at its free end a horizontal pin 38 extending from both sides, and a pin 40 extending from one side only, of the arm. Arm 144 is normally drawn downward by spring 146. As already described, pins 38 engage ears 28 of the outer card assembly at one side of the magazine while latches 36 engage ears 26 of the outer card at the other side of the magazine in order to hold the cards securely in place while the magazine is being moved about in the operation of the machine. When the magazine is moved to the right, as shown, for instance, in Figs. 5 and 6, the upper ears 26 of the card assembly at the extreme right of the magazine pass onto hangers 148, fast to the machine frame, and the assembly is left hanging there with its outer card on display, until the magazine retreats, turns over, and advances again. In order to leave the card in display position it is necessary to free pins 38 from engagement with ears 28 of the card assembly which the magazine is to leave behind. This operation will be understood from Figs. 5 to 9 inclusive. Underneath each pin 38 is a horizontal arm 150 projecting from the upper end of a vertical slide 152. The lower end of slide 152 rests on a pin 154 projecting horizontally from rock shaft 156. An arm 158 (Fig. 3), fast on shaft 156, has its free end connected by vertical link 160 to the free end of a horizontal arm 162 pivoted on the frame at 164 and having a roller 166 riding on cam 80, which therefore acts to move member 152 vertically. Spring 168 serves to keep member 152 in contact with pin 154. Cam 80 is so timed that arm 150 of slide 152 engages pin 38 to raise it above ear 28, after a card assembly has been hung on bracket 148 and before the magazine moves away again. This upward movement of pin 38 raises arm 144 and pin 40 from the position in Fig. 7 to the position in Fig. 8. This means that pins 38 are free from ears 28 of the card assembly hanging on bracket 148, and that pins 40 are in position to engage ears 28 of the next assembly in the magazine in order to prevent that card being left behind when the magazine begins its retrograde movement. To positively prevent the display assembly from following the magazine, a hook 170, integral with slide 152 and arm 150, is raised to the position shown in Fig. 8 and remains there until the magazine has moved away far enough for pins 38 to pass off arms 150, whereupon slide 152 is lowered to normal position by cam 80.

While a card is thus left hanging on display, the magazine retreats and is turned over, as already described, and then advances until latches 36 at the rear of the magazine automatically engage the upper and lower ears 126 of the card assembly hanging on bracket 148, at the same time pushing all the cards in the magazine along guides 34 until ears 28 of the outermost card assembly at the other side of the magazine are against pins 38.

The magazine then retreats, turns over, and again advances to hang another card on display, and so on in repeating cycles.

It is to be understood that the invention is not limited to the specification embodiment herein illustrated and described but may be used in other ways without departure from its spirit as defined by the following claims.

We claim:

1. In an advertising device, in combination, a card magazine, means for advancing and withdrawing said magazine, and means for rotating said magazine whereby cards from said magazine may be successively placed in display position and removed from said position, substantially as described.

2. In an apparatus of the class described, in combination, a card magazine, means for advancing said magazine to place the card at the front of said magazine in display position, means for detaching said card from said magazine while in that position, means for withdrawing said magazine from said card, and means for again advancing said magazine, and means effective while so advanced for re-attaching said card to said magazine.

3. The invention set forth in claim 2 in which means is provided for rotating said magazine while it is withdrawn, whereby when the card is re-attached to said magazine it will be at the rear thereof.

4. In apparatus of the class described, in combination, a magazine containing a plurality of cards having display matter on front and rear sides thereof, means for advancing said magazine to place in display position the front side of the card at the front of said magazine, means for detaching said card from said magazine while the card is in display position, means for thereafter withdrawing said magazine away from said card, means effective while the magazine is withdrawn for rotating said magazine through a half-revolution, and means effective after the rotation has been effected for advancing said magazine to said display card, and means for thereupon attaching the card to the rear of said magazine.

5. In apparatus of the class described, in combination, a magazine containing a plurality of cards having display matter on front and rear sides thereof, means for advancing said magazine to place in display position the front side of the card at the front of said magazine, means for detaching said card from said magazine while the card is in display position, means for thereafter withdrawing said magazine away from said card, means effective while the magazine is withdrawn for rotating said magazine through a half-revolution, means effective after the rotation has been effected for advancing said magazine to said display card, means for thereupon attaching the card to the rear of said magazine, means for then rotating said magazine through another half-revolution, and means for again advancing said magazine to hang the next card at the front thereof in display position, substantially as described.

6. The invention set forth in claim 5, in which means is provided for causing the apparatus to repeat its operations whereby the front sides of all cards in the magazine are shown in succession and then the rear sides of the cards are shown in succession in recurring cycles, substantially as described.

In testimony whereof we hereto affix our signatures.

CHARLES ROBERTS.
CHARLES H. BAUER.